US007492370B2

(12) United States Patent
Lin et al.

(10) Patent No.: US 7,492,370 B2
(45) Date of Patent: Feb. 17, 2009

(54) MANAGEMENT METHOD AND DISPLAY METHOD OF ON-SCREEN DISPLAY THEREOF AND RELATED DISPLAY CONTROLLING DEVICE

(75) Inventors: Hung-Yi Lin, Hsin-Chu (TW); Jiunn-Kuang Chen, Tao-Yuan (TW)

(73) Assignee: MStar Semiconductor, Inc., Hsin-Chu Hsien (TW)

( * ) Notice: Subject to any disclaimer, the term of this patent is extended or adjusted under 35 U.S.C. 154(b) by 377 days.

(21) Appl. No.: 10/906,941

(22) Filed: Mar. 14, 2005

(65) Prior Publication Data

US 2005/0212808 A1 Sep. 29, 2005

Related U.S. Application Data

(60) Provisional application No. 60/556,074, filed on Mar. 25, 2004.

(51) Int. Cl.
*G09G 5/22* (2006.01)
*G09G 5/39* (2006.01)
*G06T 11/00* (2006.01)

(52) U.S. Cl. ........................ 345/551; 345/467; 345/531

(58) Field of Classification Search ................. 345/540, 345/531, 512
See application file for complete search history.

(56) References Cited

U.S. PATENT DOCUMENTS

| | | | | |
|---|---|---|---|---|
| 5,129,059 | A * | 7/1992 | Hannah | 345/571 |
| 6,219,072 | B1 * | 4/2001 | Tanaka et al. | 345/531 |
| 6,967,689 | B1 * | 11/2005 | Chu | 348/569 |
| 2002/0085009 | A1 * | 7/2002 | Yamagata | 345/531 |
| 2003/0156115 | A1 * | 8/2003 | Emmot | 345/531 |
| 2005/0193317 | A1 * | 9/2005 | Chen et al. | 714/758 |

* cited by examiner

*Primary Examiner*—Kee M Tung
*Assistant Examiner*—Jacinta Crawford
(74) *Attorney, Agent, or Firm*—Winston Hsu

(57) ABSTRACT

A OSD management method for writing OSD data into a memory, the management method includes: respectively writing a first partial data and a second partial data of the first OSD data into a first memory space and a second memory space of the memory; and respectively writing a third partial data and a fourth partial data of the first OSD data into a third memory space and a fourth memory space of the memory; wherein the first and third memory space associate with a first row address of the memory, and the second and fourth memory space associate with a second row address of the memory.

16 Claims, 9 Drawing Sheets

MANAGEMENT METHOD AND DISPLAY METHOD OF ON-SCREEN DISPLAY THEREOF AND RELATED DISPLAY CONTROLLING DEVICE

CROSS REFERENCE TO RELATED APPLICATIONS

The application claims the benefit of U.S. Provisional Application No. 60/556,074, which was filed on Mar. 25, 2004.

BACKGROUND OF INVENTION

1. Field of the Invention

The invention relates to a display method, and related display controlling device capable of on-screen display, and more particularly, to a display method, and related display controlling device utilizing a DRAM to perform the on-screen display.

2. Description of the Prior Art

On-screen display (OSD) can be primarily divided into two kinds of OSD. The first OSD is a graphic based OSD system. This OSD system stores the whole picture in a memory by pixels. When the picture is displayed, the OSD system reads all the pixels of the picture from the memory in order to drive a display panel to display the picture. In other words, even though the picture contains some items in common (for example, the picture may be a stream, and there may be a lot of the same characters A in the stream), repetitively storing and processing every single pixel is required. The result is that the same items are read and stored from the memory many times.

The above-mentioned graphic based OSD system wastes enormous memory space by storing the same things. Therefore, a second OSD system, the font based OSD system, has been developed. The font based OSD system utilizes a block as a unit, and can store reusable font blocks in the memory. The font based OSD system can store a memory address of each block and block index (font index) in a look-up table. For example, the font based OSD system can store the picture block of characters A-Z in the memory and the corresponding memory addresses of the characters A-Z. Therefore, if the font based OSD system has to display a character A in a block of a display screen, the font based OSD system only has to input the font index of the character A, and the font based OSD system can access the corresponding memory address of the character A through the look-up table. Then, the font based OSD can read the picture of the character A. As mentioned above, the font based OSD system can re-use the block picture stored in the memory. In contrast to the graphic based OSD system, the font based OSD system saves memory space.

Generally speaking, the font based OSD system stores OSD data in a static random access memory (SRAM). Because the SRAM has characteristics of quick access, the OSD system can access the font data quickly. It is well known, however, that the SRAM requires lots of transistors and thus occupies a significant chip area for OSD.

Normally, a system chip is coupled to a dynamic random access memory (DRAM), which is addressed by a row address, a column address, and a bank address. In addition, if two data are read from or stored in the DRAM and the two data associate with different row addresses, many memory cycles are required to access the DRAM.

Please refer to FIG. 1, which is a timing diagram of accessing two data from the DRAM. As shown in FIG. 1, the data DATA0 and the data DATA1 respectively associate with the row address $R_0$ and the row address $R_1$. Therefore, accessing the two data DATA0 and DATA1 comprises the following steps:

1. Activate the memory space corresponding to the row address $R_0$ of the DRAM;

2. Access the data DATA0 from the memory space corresponding to the row address $R_0$;

3. Pre-charge the memory space corresponding to the row address $R_0$;

4. Activate the memory space corresponding to the row address $R_1$ of the DRAM; and 5. Access the data DATA1 from the memory space corresponding to the row address $R_1$;

As mentioned above, as long as the two data are stored in different row addresses $R_0$ and $R_1$, the above-mentioned steps are performed in order to access the two data. In addition, with the data DATA1 displayed, assume that another data DATA2 stored in the row address $R_0$ also needs to be displayed on the screen. Because the data DATA1 is stored in the row address $R_1$, the OSD system still has to perform many steps to switch to the row address $R_0$ in order to read the data DATA2. This process is therefore very complex, and wastes enormous memory bandwidth, which results in a poor accessing performance. In some cases where the DRAM is frequently accessed, the prior art OSD system cannot utilize DRAM to store the font data.

SUMMARY OF INVENTION

It is therefore one of the primary objectives of the claimed invention to provide a management method, a display method, and related display device utilizing DRAM to store font data, to solve the above-mentioned problem.

According to an exemplary embodiment of the claimed invention, a management method of on-screen display (OSD) for writing a first OSD data and a second OSD data into a memory is disclosed. The management method comprises: respectively writing a first partial data and a second partial data of the first OSD data into a first memory space and a second memory space of the memory; and respectively writing a third partial data and a fourth partial data of the second OSD data into a third memory space and a fourth memory space of the memory; wherein the first and the third memory space associate with a first row address, and the second and the fourth memory space associate with a second row address.

In addition, a display controlling device for controlling a display is disclosed. The display controlling device comprises: a nonvolatile storage device for nonvolatily storing a program code; a volatile storage device; and a display controller coupled to the nonvolatile storage device and the volatile memory for reading and executing the program code to respectively write a first partial data and a second partial data of a first OSD data into a first memory space and a second memory space of the volatile memory and to respectively write a third partial data and a fourth partial data of a second OSD data into a third memory space and a fourth memory space of the volatile memory; wherein the first and the third memory space associate with a first row address, and the second and the fourth memory space associate with a second row address.

Furthermore, a display method of the OSD data for displaying a plurality of fonts is disclosed, where the fonts are displayed on the same horizontal position, and each font comprises n scan lines and associates with a font index. The display method comprises: reading each scan line of the fonts sequentially line by line from DRAM according to a sequence number of each scan line in order to display the fonts on a display.

The present invention can store font data in the DRAM so that the cost embedded memory is saved. Additionally the memory bandwidth can be utilized more efficiently and the speed of data access is raised. Furthermore, the OSD system can efficiently display pictures without the continuity and completeness of a normal picture being influenced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
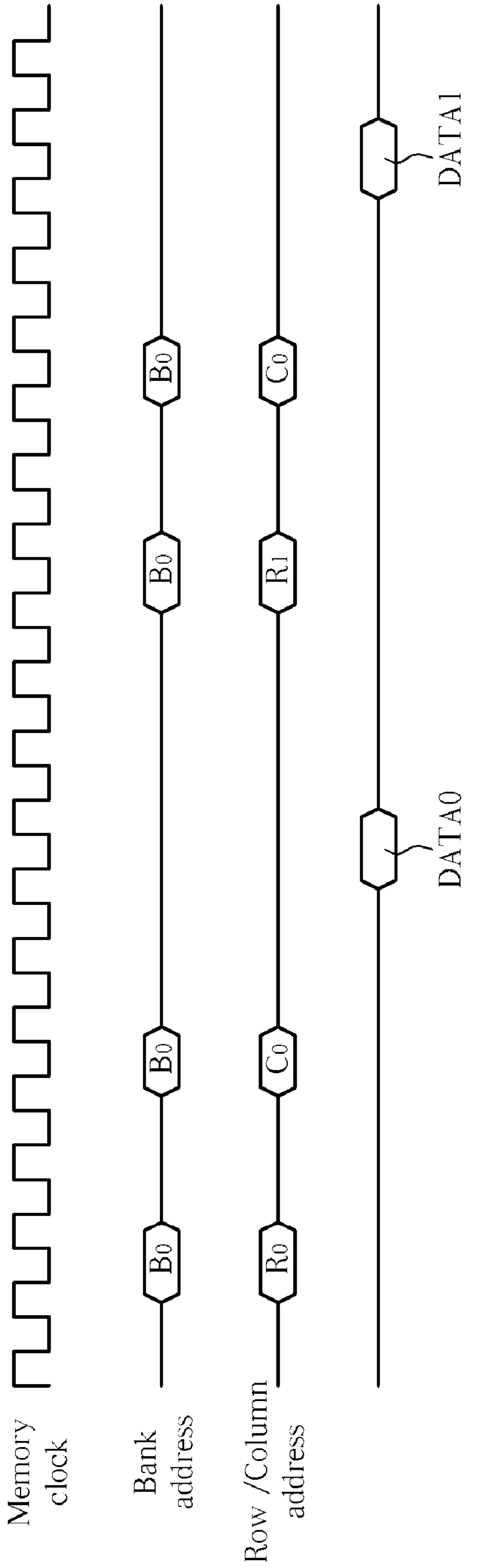
Fig. 1 Prior art
FIG. 1 is a timing diagram of accessing two data from the DRAM according to the prior art.
Figure 2:
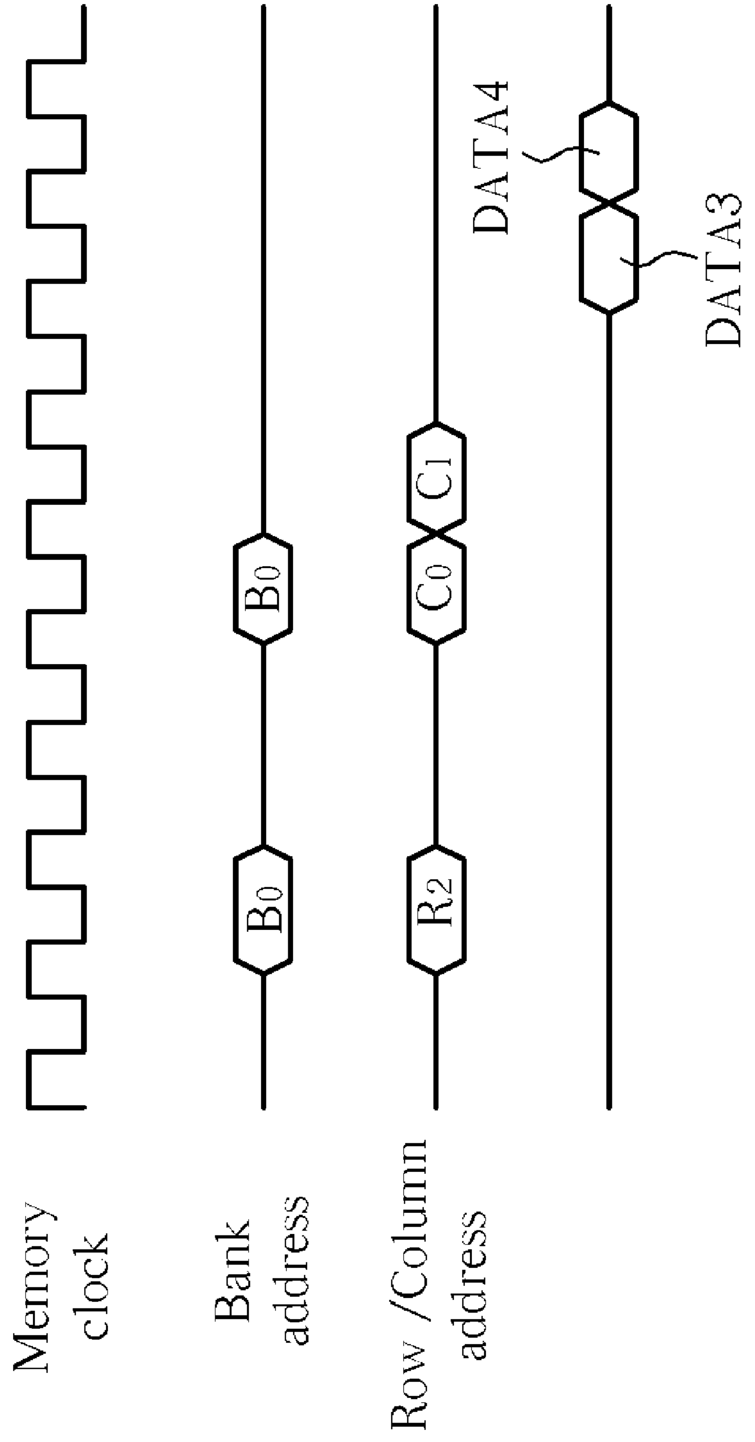
FIG. 2 is a timing diagram of accessing two data corresponding to the same row address of DRAM.

Please refer to FIG. 2, which is a timing diagram of accessing two data corresponding to the same row address of DRAM. When the data DATA3 and data DATA4 correspond to the same row address $R_2$, the two data DATA3 and DATA4 can be continuously read without switching row addresses.

In order to simply illustrate the operation of the present invention, in the following disclosure, the font based OSD system only shows two fonts. Please note that the OSD system according to the present invention can access more fonts, and the number of the fonts here is only utilized as an illustration, not a limitation.

Figure 3:
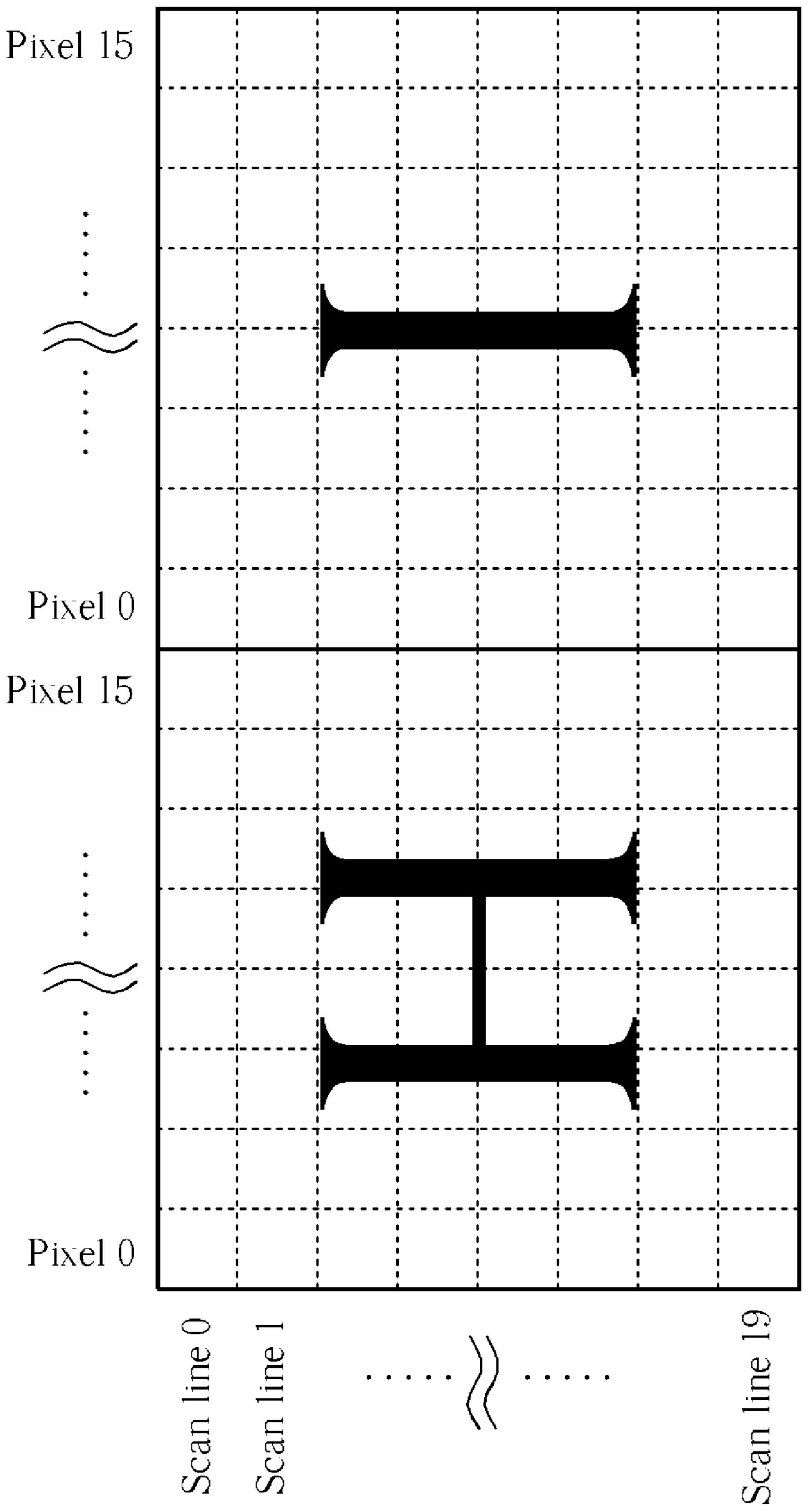
FIG. 3 is a diagram of fonts displayed by the font based OSD system according to the present invention.

FIG. 3 is a diagram of fonts displayed by the font based OSD system according to the present invention. In this embodiment, two fonts "Hi" are utilized as an example, wherein each font H and I comprises 20 scan lines (scan line 0-scan line 19), and each scan line comprises 16 pixels (pixel 0-pixel 15). When the OSD system displays the fonts H and I, each font is displayed from the first scan line (scan line 0). In other words, the OSD system first displays the scan line 0 of the font H, then displays the scan line 0 of the font I, and then displays the scan line 1 of the font H and the scan line 1 of the font I, and so on, until the OSD system displays all 20 scan lines of the fonts H and I.

Figure 4:
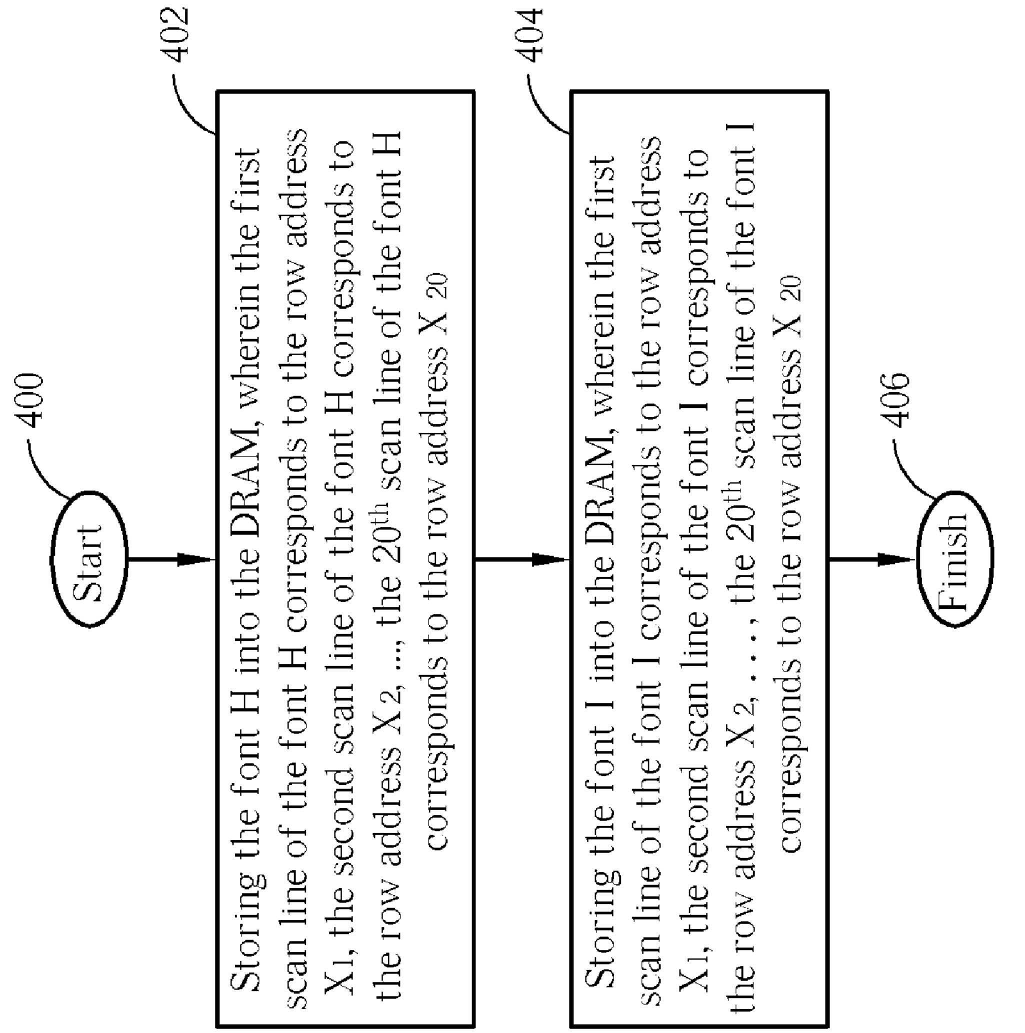
FIG. 4 is a flow chart of storing fonts into a DRAM according to the present invention.

Please refer to FIG. 4, which is a flow chart of storing fonts into a DRAM according to the present invention. The flow chart comprises the following steps.

Step 400: Start;

Step 402: Store the font H into the DRAM, wherein the first scan line of the font H corresponds to the row address $X_1$, the second scan line of the font H corresponds to the row address $X_2$, . . . , the $20^{th}$ scan line of the font H corresponds to the row address $X_{20}$;

Step 404: Store the font I into the DRAM, wherein the first scan line of the font I corresponds to the row address $X_1$, the second scan line of the font I corresponds to the row address $X_2$, . . . , the $20^{th}$ scan line of the font I corresponds to the row address $X_{20}$;

Step 406: Finish.

In order to program OSD fonts, the font codes are obtained from an outside nonvolatile memory (for example, a ROM or a flash memory). In this embodiment, the above-mentioned font codes are the font H and the font I. Finally, the obtained font codes are stored into the DRAM one by one utilizing the above steps.

For example, the scan line 0 of the font H is first stored in the row address $X_1$ of the DRAM, the scan line 1 is then stored in the row address $X_2$ of the DRAM, . . . , and the scan line 19 is stored in the row address $X_{20}$ of the DRAM (step 402). In addition, the scan line 0 of the font I is first stored in the row address $X_1$ of the DRAM, the scan line 1 is then stored in the row address $X_2$ of the DRAM, . . . , and the scan line 19 is stored in the row address $X_{20}$ of the DRAM (step 404).

In this embodiment, if there are many fonts to be displayed, the fonts may be displayed in multiple rows of the screen. Please note that if the fonts positioned at the same row of the screen are being displayed, the OSD system does not need to switch the row addresses if the same scan line of the fonts is displayed. Only if the scan line is changed (for example, the scan line 0 is totally displayed, and the scan line 1 is then to be displayed.), then the OSD system performs switching the row address. For example, when displaying the first scan line (the scan line 0) of the fonts H and I, because the first scan lines of the fonts H and I correspond to the row address $X_1$, the OSD system can successfully access the first scan lines of the fonts H and I without performing the activating and pre-charging steps twice. For example, if 20 fonts corresponding to the same row of the screen have to be displayed, the present invention OSD system can directly display the first scan line of the 20 fonts without switching the row address. Thus, the DRAM bandwidth for OSD is saved.

On the other hand, when the present OSD system stores fonts into the DRAM, a huge memory bandwidth is consumed. Because, in this preferred embodiment, different scan lines of a font (such as the font H) correspond to different row addresses, when storing different scan lines, changing row addresses, including pre-charging and activating, needs to be performed. Furthermore, because the fonts are written into the DRAM one by one, and each font has 20 scan lines, each font is stored by changing row addresses 20 times. The memory bandwidth is heavily consumed while storing fonts in this embodiment. Preferably, the present invention programs the fonts to DRAM when the whole system is initialized. The period of initializing the system is sufficient for the OSD to store all fonts into the memory (DRAM).

Figure 5:
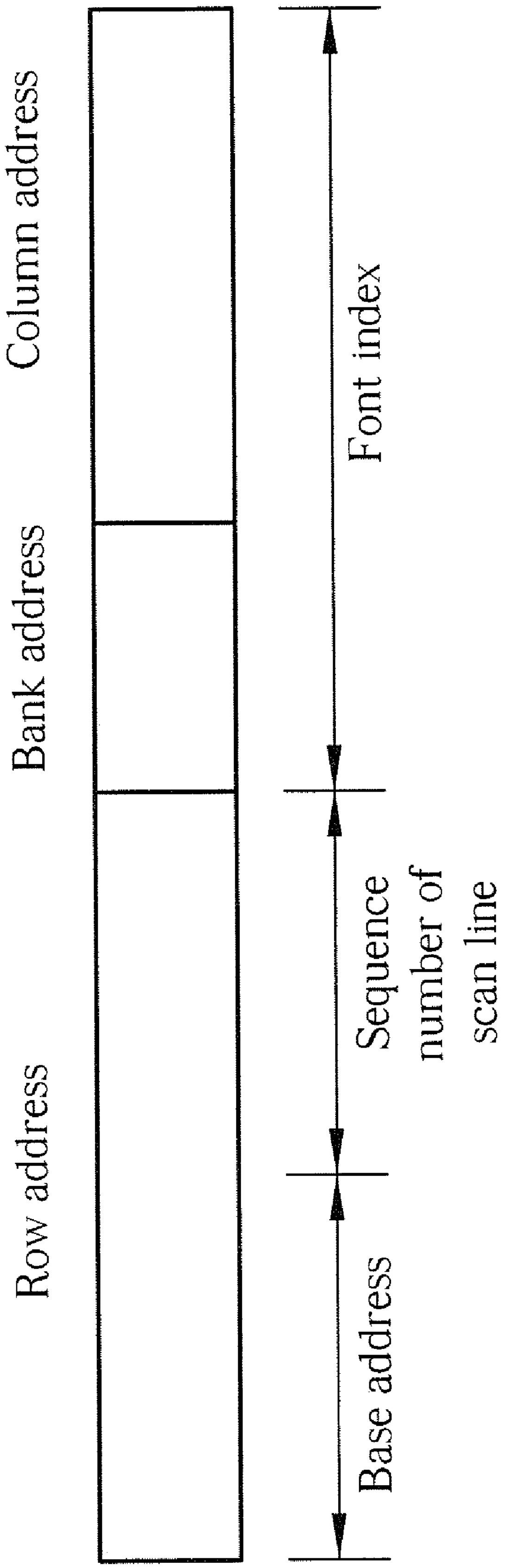
FIG. 5 shows a font structure with a font index and a memory address according to a first embodiment of the present invention.

Please refer to FIG. 5, which is a font structure with a font index and a memory address according to a first embodiment of the present invention. In this embodiment, different fonts have different font indexes. In addition, the font index indicates the bank address and the column address, and the sequence number of the scan line indicates the row address. Therefore, the whole address of the font is determined. A DRAM with a 16-bit data width is exemplified in this embodiment, that is, 16-bit data can be output one time through the data bus. Therefore, if the OSD system is displaying the scan line 1 of the font H, because different fonts correspond to different font indexes, "H" indicates the font index of the font H and the corresponding band address and the column address of the font H can be known. Furthermore, because different sequence numbers of scan lines (for example, the scan line "0" or the scan line "1") correspond to different row addresses, the row address of the scan line 1 can be known. So the whole address is known, and the 16-bit data can be read from the DRAM to obtain all pixel data of the scan line 1. In this embodiment, as shown in FIG. 5, the base address and the sequence number of the scan line of the font can be combined to obtain the corresponding row address.

It should be noted that in the above-mentioned embodiment, different scan lines preferably correspond to different row addresses. In fact, if the number of the fonts is not great, different scan lines can be managed to be stored in the same row address in order to raise the efficiency of storing the fonts. In order to achieve the above-mentioned function, the font structure should be modified accordingly.

Figure 6:
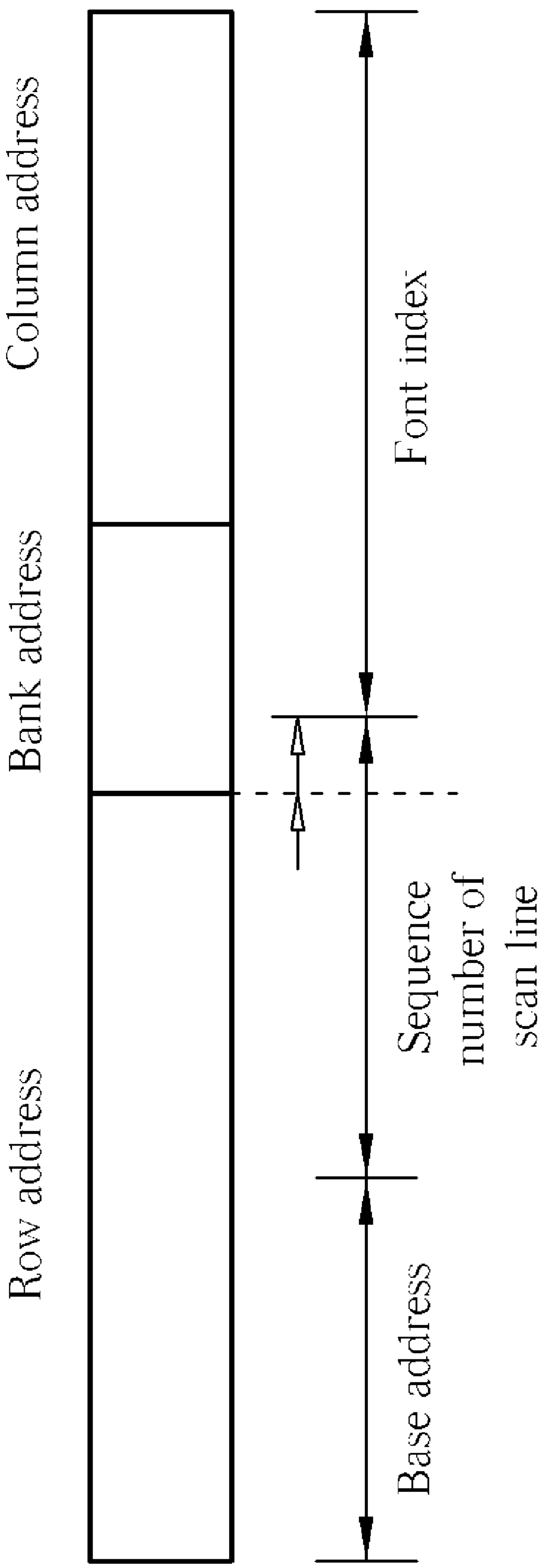
FIG. 6 is a font structure with the font index and the address according to a second embodiment of the present invention.

FIG. 6 shows a font structure of the font index and the address according to a second embodiment of the present invention. In this embodiment, the font index associates with part of the bank address and the column, and the sequence number of the scan line associates with not only the row address, but also part of the bank address. Therefore, because only part of the bank address can be used, the memory space, which can be utilized to store the fonts, is reduced, and the number of stored fonts is also reduced. Similar changes should not depart from the spirit of the present invention.

Figure 7:
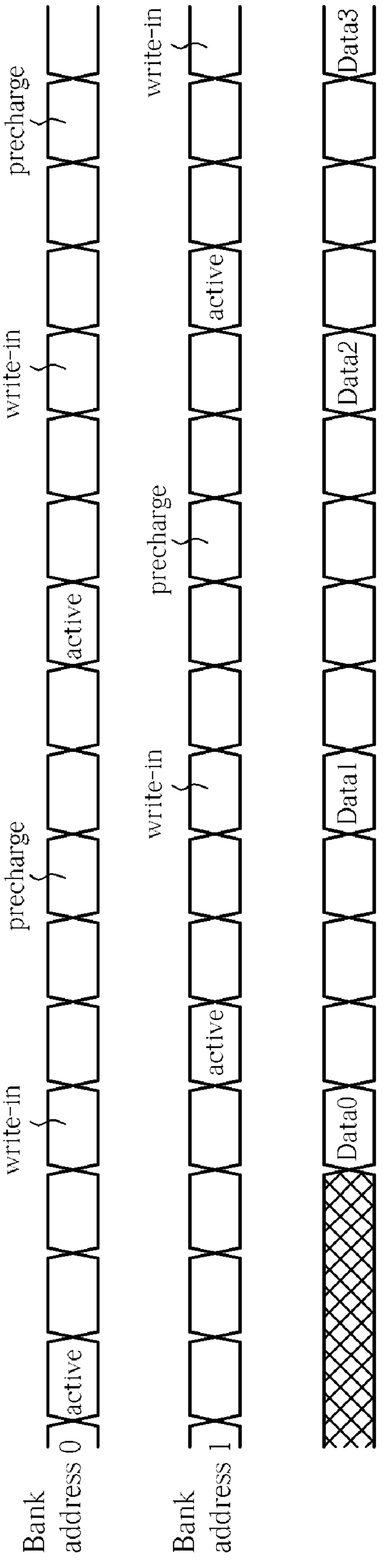
FIG. 7 is a timing diagram of a bank interleaved access of the DRAM based on the second embodiment shown in FIG. 6.

Please refer to FIG. 7, which is a timing diagram of a bank interleave access of the DRAM based on the second embodiment shown in FIG. 6. As shown in FIG. 7, the bank address 1 does not have to wait for the bank address 0 to completely perform the activating, writing-in, and pre-charging steps. In fact, the bank address 1 can be operated when the bank address 0 has just finished the activating operation. Therefore, the time of writing fonts in the DRAM can be reduced. The above-mentioned operation is called a bank interleave.

Figure 8:
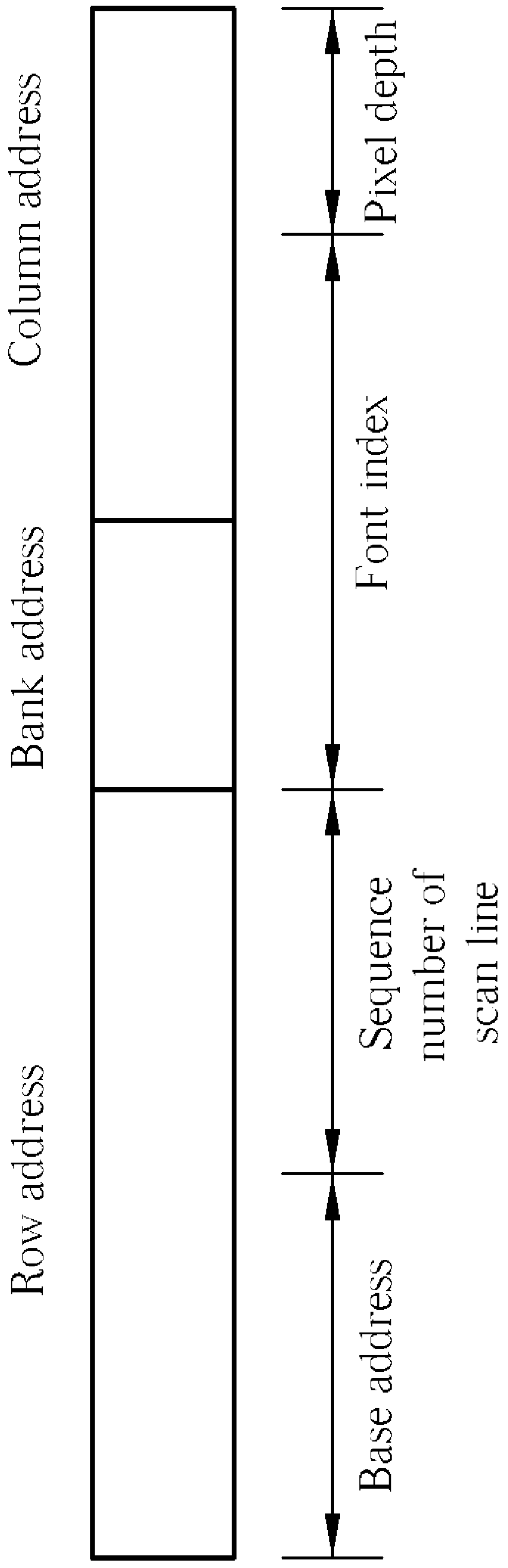
FIG. 8 is a font structure with the font index and the address according to a third embodiment of the present invention.

In addition, in the above-mentioned embodiments, the fonts are all one-color fonts. In the actual implementation, however, the fonts can be multi-color fonts. FIG. 8, shows a font structure with the font index and the address according to a third embodiment of the present invention. As shown in FIG. 8, in the last of the column address, a lease significant portion of the column address is reserved for the pixel depth, so the OSD system can display a multi-color scan line according to the pixel depth. For example, if each pixel depth is 2-bit, the pixel can be displayed in four different colors.

Figure 9:
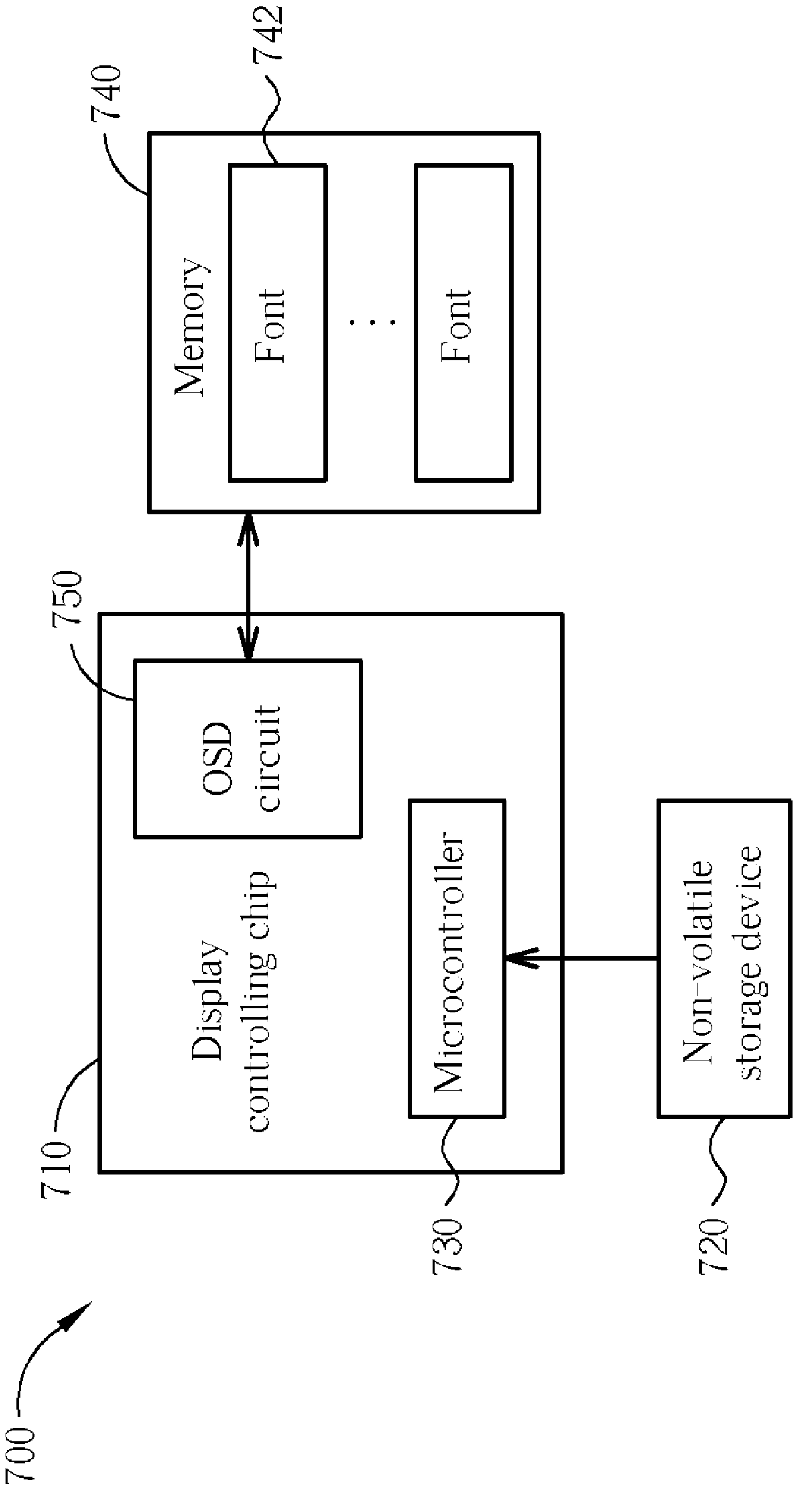
FIG. 9 is a block diagram of a display controlling device according to the present invention.

Please refer to FIG. 9, which is a block diagram of a display controlling device 700 according to the present invention. The display controlling device 700 comprises a display controller 710, a nonvolatile storage device 720, a micro-controller 730, an OSD circuit 750, and a memory 740. Please note that the nonvolatile storage device 720 can be a flash memory for storing a program code (not shown), and the memory 740 can be a DRAM for storing a plurality of fonts 742. The display controller 710 is coupled to the nonvolatile storage device 720 and the memory 740 for reading and executing the program code stored in the nonvolatile storage device 720, and for programming the fonts 742 into the memory 740 by cooperating the program code. The display controller 710 preferably cooperates with the OSD circuit 750 and the micro-controller 710 (such as an 8051 micro-controller) to perform the above-mentioned operations. The micro-controller 710 can also be implemented in the display controller 710 or in the flash memory 720, or independently implemented as an independent chip, which can be shared by all chips of the whole system. Therefore, the system structure mentioned above is only utilized as a preferred embodiment, and not a limitation. Furthermore, the display controlling device 700 can be preferably implemented by a system motherboard, and the display controller 710 can be implemented in forms of various kinds of system chips. Because many system chips need the OSD function, the present invention can be utilized in not only the LCD TV controller field, but also in other fields. Those skilled in the art can make possible changes in view of the above disclosure without departing from the spirit of the present invention.

In contrast to the prior art, the present invention can manage the OSD font data in the DRAM to perform the on-screen display. Therefore, the present invention saves the cost of the embedded SRAM and reduces the chip size, instead of interfering normal video display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a plurality of on-screen display (OSD) fonts, the method comprising:

writing a plurality of scan lines of each font into an external memory by associating each scan line of each font with a row address of the external memory, and storing scan lines of the fonts having a same scan line number in a same row address of the external memory; and reading a subset of fonts from the external memory by reading all scan lines of the subset of fonts being stored in a same row address of the external memory without switching to another row address of the external memory, in order to display the subset of fonts on a display.

2. The method of claim 1 wherein the writing step is performed while a display controller is being initialized.

3. The method of claim 1 wherein each scan line of each OSD font is associated with a corresponding row address, and a font index of each OSD font is associated with a bank address of the external memory.

4. The method of claim 1 wherein a font index of each OSD font is associated with a column address and a bank address of the external memory.

5. The method of claim 1 wherein each OSD font is bank-interleaved written into the external memory.

6. The method of claim 1 wherein the external memory is a dynamic random access memory (DRAM).

7. The method of claim 6 wherein a font index and a pixel depth of each OSD font are both associated with a column address of the DRAM.

8. The method of claim 7, wherein the pixel depth represents colors.

9. A display controlling device for controlling a display, the display controlling device comprising:

a nonvolatile memory for storing program code;

an external volatile memory; and a display controller coupled to the nonvolatile memory and the external volatile memory for reading and executing the program code to write a plurality of scan lines of each of OSD font into the volatile memory by associating each scan line of each OSD font with a row address of the volatile memory, and storing scan lines of the OSD fonts having a same scan line number in a same row address of the volatile memory;

wherein the display controller is further for reading a subset of fonts from the external volatile memory by reading all scan lines of the subset of fonts being stored in a same row address of the external volatile memory without switching to another row address of the external memory, in order to display the subset of fonts on a display.

10. The display controlling device of claim 9, wherein the volatile memory is a dynamic random access memory (DRAM).

11. The display controlling device of claim 9, wherein the nonvolatile memory is a flash memory.

12. The display controlling device of claim 9 wherein each scan line of each OSD font is associated with a corresponding row address, and a font index of each OSD font is associated with a bank address of the volatile memory.

13. The display controlling device of claim 9 wherein a font index of each OSD font is associated with a column address and a bank address of the volatile memory.

14. The display controlling device of claim 9 wherein each OSD font is bank-interleaved written into the volatile memory.

15. The display controlling device of claim 9, wherein a font index and a pixel depth of each OSD font are both associated with a column address of the volatile memory.

16. The display controlling device of claim 15, wherein the pixel depth represents colors.

* * * * *